United States Patent

(12) United States Patent  
Fan

(10) Patent No.: US 9,337,741 B2  
(45) Date of Patent: May 10, 2016

(54) DC-DC CONVERSION CIRCUIT AND METHOD

(71) Applicant: Huawei Technologies Co., Ltd., Shenzhen (CN)

(72) Inventor: Xiaodong Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/586,309

(22) Filed: Dec. 30, 2014

(65) Prior Publication Data

US 2015/0236596 A1    Aug. 20, 2015

Related U.S. Application Data

(63) Continuation of application No. PCT/CN2014/081720, filed on Jul. 7, 2014.

(30) Foreign Application Priority Data

Feb. 17, 2014    (CN) .......................... 2014 1 0053294

(51) Int. Cl.
*H02M 3/335* (2006.01)
*H02M 1/00* (2006.01)

(52) U.S. Cl.
CPC ...... *H02M 3/33507* (2013.01); *H02M 3/33523* (2013.01); *H02M 3/33592* (2013.01); *H02M 2001/0025* (2013.01); *H02M 2001/0058* (2013.01); *Y02B 70/1475* (2013.01); *Y02B 70/1491* (2013.01)

(58) Field of Classification Search
None
See application file for complete search history.

(56) References Cited

U.S. PATENT DOCUMENTS

| 7,272,021 | B2 | 9/2007 | Schlecht et al. |
| 8,149,597 | B2 | 4/2012 | Farrington et al. |
| 2003/0222629 | A1 | 12/2003 | Inoue et al. |
| 2010/0231183 | A1 | 9/2010 | Jan et al. |
| 2011/0026275 | A1 | 2/2011 | Huang et al. |
| 2012/0287681 | A1 | 11/2012 | Wahledow et al. |

(Continued)

FOREIGN PATENT DOCUMENTS

| CN | 1482727 | A | 3/2004 |
| CN | 101989814 | A | 3/2011 |

(Continued)

OTHER PUBLICATIONS

Partial English Translation and Abstract of Chinese Patent Application No. CN103825459A, Apr. 28, 2015, 6 pages.

(Continued)

*Primary Examiner* — Timothy J Dole
*Assistant Examiner* — Monica Mata
(74) *Attorney, Agent, or Firm* — Conley Rose, P.C.; Grant Rodolph

(57) ABSTRACT

According to the DC-DC conversion circuit and conversion method, variation of an input voltage is reflected by detecting a voltage at a secondary winding of a transformer, a reference voltage is adjusted by using the detected input voltage signal, a feedback voltage signal is compared with the reference voltage, a duty cycle control signal is adjusted according to a comparison result, and conduction and shutting-down of switching transistors are controlled according to the duty cycle control signal to adjust an output voltage of the DC-DC conversion circuit, so as to enable the output voltage to vary with the input voltage.

9 Claims, 5 Drawing Sheets

(56) References Cited

U.S. PATENT DOCUMENTS

2013/0343094 A1  12/2013  Karlsson et al.
2014/0313784 A1* 10/2014  Strzalkowski .... H02M 3/33584
                                                    363/17

FOREIGN PATENT DOCUMENTS

| CN | 103404013 A | 11/2013 |
| CN | 103503294 A | 1/2014 |
| CN | 103825459 A | 5/2014 |
| JP | 1987201064 A | 9/1987 |
| JP | 2013055802 A | 3/2013 |
| WO | 2013003776 A2 | 1/2013 |

OTHER PUBLICATIONS

Foreign Communication From A Counterpart Application, PCT Application No. PCT/CN2014/081720, International Search Report dated Nov. 3, 2014, 8 pages.

Foreign Communication From A Counterpart Application, PCT Application No. PCT/CN2014/081720, Written Opinion dated Nov. 3, 2014, 8 pages.

Partial English Translation and Abstract of Japanese Patent Application No. JP2013055802, Oct. 20, 2015, 8 pages.

Foreign Communication From a Counterpart Application, Chinese Application No. 201410053294.4, Chinese Office Action dated Sep. 22, 2015, 7 pages.

* cited by examiner

DC-DC CONVERSION CIRCUIT AND METHOD

CROSS-REFERENCE TO RELATED APPLICATIONS

This application is a continuation of International Application No. PCT/CN2014/081720, filed on Jul. 7, 2014, which claims priority to Chinese Patent Application No. 201410053294.4, filed on Feb. 17, 2014, both of which are hereby incorporated by reference in their entireties.

TECHNICAL FIELD

This application relates to the field of circuit technologies, and in particular, to a direct current (DC)-DC conversion circuit and method.

BACKGROUND

In a current communications system, an intermediate bus architecture (IBA) is used in most power supplies, because the IBA makes up for shortcomings of a distributed power architecture (DPA).

The IBA allocates isolation, voltage transformation, and voltage regulation functions of a DC-DC power module to two components, where the two components are an intermediate bus converter (IBC) and a non-isolation point-of-load (niPoL) converter.

The IBC has the voltage regulation and isolation functions. The niPoL provides the voltage regulation function.

The IBC converts a voltage at a distribution bus at which a voltage is half regulated to a voltage (which generally is 12 volts (V)) of an isolated intermediate bus at which a voltage is not regulated, and supplies power to a chain of niPoLs.

The niPoL is close to a load and provides the voltage transformation and voltage regulation functions.

A principle of the IBA is to reduce a voltage of a bus to a voltage which is slightly higher than that of a point-of-load, and the rest of work is done by a niPoL which is cheaper.

Therefore, compared with the DPA, the IBA enjoys advantages of low costs and dynamic features, thereby becoming a mainstream power supply architecture in the current communications system.

With strengthening of a board service capability, an increasing number of conversion modules based on a point-of-load (POL) power supply are supplied, and power is increasingly high, but an area of a circuit board remains unchanged or even shrinks, which imposes an increasingly high requirement on efficiency of an IBA power supply.

Referring to FIG. 1, FIG. 1 is a schematic diagram of an IBA topology provided in the prior art.

A working mode with an almost 50% fixed duty cycle is used in this IBA topology. That is, in a previous half period of an input voltage Vin, a first switching transistor Q1 and a third switching transistor Q3 are conducted simultaneously with a sixth switching transistor Q6 at the almost 50% fixed duty cycle, and in a later half period of the Vin, a second switching transistor Q2 and a fourth switching transistor Q4 are conducted with a fifth switching transistor Q5 at the almost 50% fixed duty cycle symmetrically with the previous half period.

In this working mode, all of the switching transistors (Q1-Q6) can achieve zero voltage switch (ZVS) conduction, so as to reduce switch loss, and meanwhile because no additional filter inductor is required for output, copper loss and iron loss of the filter inductor can also be reduced, so that conversion efficiency of the whole topology can be the best. This working manner, in which a duty cycle of the switching transistors is not controlled by a loop, is also called open-loop control.

Although the open-loop control with a fixed duty cycle can achieve high-efficiency power conversion, because an output voltage is uncontrollable by the open-loop control, adjustment of the output voltage is inevitably worsened.

SUMMARY

Embodiments of the present invention provide a DC-DC conversion circuit, which not only can achieve higher conversion efficiency, but also skips generating a greater inrush current when a power supply is powered on or at a transient change of an input voltage.

According to a first aspect, a DC-DC conversion circuit is provided and includes: an output voltage detection module, an input voltage detection module, a reference voltage generating module, a comparing module, a control module, and a driving module; where the output voltage detection module is configured to detect an output voltage of the DC-DC conversion circuit, and generate a feedback voltage signal in a linear relationship with the output voltage; the input voltage detection module is configured to detect a voltage at a secondary winding end of a transformer in the DC-DC conversion circuit, and generate an input voltage signal in a linear relationship with the voltage at the secondary winding end; the reference voltage generating module is configured to generate a reference voltage according to the input voltage signal; where the reference voltage is in a linear relationship with the input voltage signal; the comparing module is configured to compare the feedback voltage signal and the reference voltage, and send a comparison result to the control module; the control module is configured to generate a duty cycle control signal according to the comparison result, and output the duty cycle control signal to the driving module; and the driving module is configured to drive a switching transistor in the DC-DC conversion circuit according to the duty cycle control signal.

In a first possible implementation manner of the first aspect, the reference voltage is in a linearly proportional relationship with the input voltage signal and the feedback voltage signal, which is specifically:

$$V_d = Vin\_dec * K * D / N;$$

where, $V_d$ is the reference voltage; Vin_dec is the input voltage signal; D is a working duty cycle of the switching transistor in the DC-DC conversion circuit; N is a turns ratio of a primary winding to a secondary winding of the transformer in the DC-DC conversion circuit; and K is a constant.

With reference to the first aspect and the first possible implementation manner of the first aspect in a second possible implementation manner, the DC-DC conversion circuit further includes: an output current detection module and a reference voltage correction module; where the output current detection module is configured to detect an output current of the DC-DC conversion circuit, generate a feedback current signal, and send the feedback current signal to the reference voltage correction module; and the reference voltage correction module is configured to correct the reference voltage by using the feedback current signal.

With reference to the first aspect and any one of the foregoing possible implementation manners, in a third possible implementation manner, a correction relationship by means of which the reference voltage correction module is configured to correct the reference voltage $V_d$ by using the feedback current signal Iout_dec is:

$$V_d' = K1 * V_d;$$

$$K1 = (1 - M * Iout\_dec);$$

where, K1 is a correction coefficient; $V_d{}'$ is a reference voltage after the correction; and M is a circuit voltage drop coefficient and is a constant.

With reference to the first aspect and any one of the foregoing possible implementation manners, in a fourth possible implementation manner, the duty cycle control signal controls the working duty cycle of the switching transistor to be 40%-49%.

With reference to the first aspect and any one of the foregoing possible implementation manners, in a fifth possible implementation manner, a primary circuit of the DC-DC conversion circuit includes: a first switching transistor, a second switching transistor, a third switching transistor, a fourth switching transistor, a fifth switching transistor, a sixth switching transistor, and the transformer; a first end of the first switching transistor is connected to a positive end of an input voltage, and a first end of the fourth switching transistor is connected to the positive end of the input voltage; and a second end of the first switching transistor is connected to a homonymous end of a primary winding of the transformer, and a second end of the fourth switching transistor is connected to a non-homonymous end of the primary winding of the transformer; a first end of the second switching transistor is connected to the homonymous end of the primary winding of the transformer, and a first end of the third switching transistor is connected to the non-homonymous end of the primary winding of the transformer; and a second end of the second switching transistor is connected to a negative end of the input voltage, and a second end of the third switching transistor is connected to the negative end of the input voltage; a first end of the fifth switching transistor is connected to a homonymous end of the secondary winding of the transformer, and a first end of the sixth switching transistor is connected to a non-homonymous end of the secondary winding of the transformer; and a second end of the fifth switching transistor is connected to a negative end of the output voltage, and a second end of the sixth switching transistor is connected to the negative end of the output voltage; and a tap of the secondary winding of the transformer is connected to a positive end of the output voltage.

With reference to the first aspect and any one of the foregoing possible implementation manners, in a sixth possible implementation manner, the DC-DC conversion circuit further includes: a filter inductor; where the tap of the secondary winding of the transformer is connected to the positive end of the output voltage through the filter inductor; and the input voltage detection module is configured to detect the voltage at the secondary winding end of the transformer at a common end of the filter inductor and the tap of the secondary winding.

With reference to the first aspect and any one of the foregoing possible implementation manners, in a seventh possible implementation manner, the DC-DC conversion circuit is applied in an intermediate bus power supply architecture, and the output voltage of the DC-DC conversion circuit supplies power to a point-of-load of the intermediate bus power supply architecture.

According to a second aspect, a DC-DC conversion method is provided, applied in a DC-DC conversion circuit, and includes the following steps: detecting an output voltage of the DC-DC conversion circuit, and generating a feedback voltage signal in a linear relationship with the output voltage; detecting a voltage at a secondary winding end of a transformer in the DC-DC conversion circuit, and generating an input voltage signal in a linear relationship with the voltage at the secondary winding end; generating a reference voltage according to the input voltage signal; where the reference voltage is in a linear relationship with and the input voltage signal; comparing the feedback voltage signal and the reference voltage so as to generate a comparison result; adjusting a duty cycle control signal according to the comparison result; and driving a switching transistor in the DC-DC conversion circuit according to the duty cycle control signal.

In a first possible implementation manner of the second aspect, before the comparing the feedback voltage signal and the reference voltage, the method further includes: detecting an output current of the DC-DC conversion circuit, and generating a feedback current signal in a linear relationship with the output current; and correcting the reference voltage by using the feedback current signal.

According to the DC-DC conversion circuit provided in the foregoing technical solution, variation of an input voltage is reflected by detecting a voltage at a secondary winding end of a transformer, a reference voltage is adjusted by using t the voltage detected at the secondary winding, a feedback voltage signal is compared with the reference voltage, a duty cycle control signal is adjusted according to a comparison result, and conduction and shutting-down of a switching transistor are controlled according to the duty cycle control signal to adjust an output voltage of the DC-DC conversion circuit, so as to enable the output voltage to vary with the input voltage. Therefore, the circuit provided in the present invention is a closed-loop control circuit and adjusts the output voltage by detecting the output voltage, and in addition, the reference voltage is not fixed but varies with the input voltage, so that a duty cycle does not vary in a wide range but is slightly adjusted in a small rage, because an excessively wide range in which the duty cycle is adjusted may reduce conversion efficiency of the DC-DC conversion circuit. In conclusion, the circuit provided in the embodiments can not only adjust the output voltage according to the variation of the input voltage, but also achieve higher conversion efficiency.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the foregoing objective, features, and advantages of the present invention clearer to understand, the following describes the specific embodiments of the present invention in detail with reference to the accompanying drawings.

It should be noted that, the embodiments of the present invention provide a DC-DC conversion circuit, where according to the DC-DC conversion circuit, an input voltage (Vin) is reflected by detecting a voltage at a secondary winding end of a transformer, a reference voltage is adjusted by using the voltage detected at the second winding end, and the reference voltage is compared with a detected output voltage, so as to adjust a duty cycle control signal. That is, in the embodiments of the present invention, adjustment of a duty cycle is implemented through closed-loop control, and the duty cycle is not fixed or unchanged. The reference voltage increases with an increase of the Vin, so that the output voltage also increases with the Vin.

It may be understood that, a working principle of the DC-DC conversion circuit provided in the embodiments of the present invention may be applied in any case in which a DC-DC power supply is used, and in the following embodiments, only the DC-DC conversion circuit applied in an IBA is used as an example for description.

Circuit Embodiment 1

Figure 1:
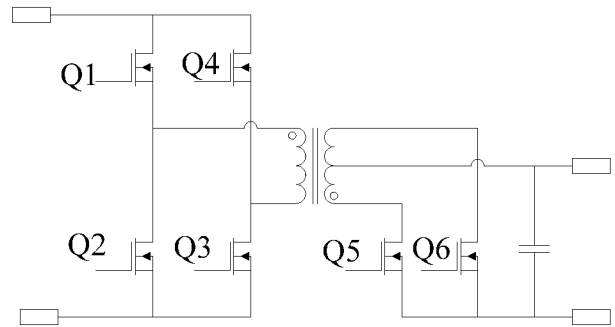
FIG. 1 is a schematic diagram of an IBA topology provided in the prior art.
Figure 2:
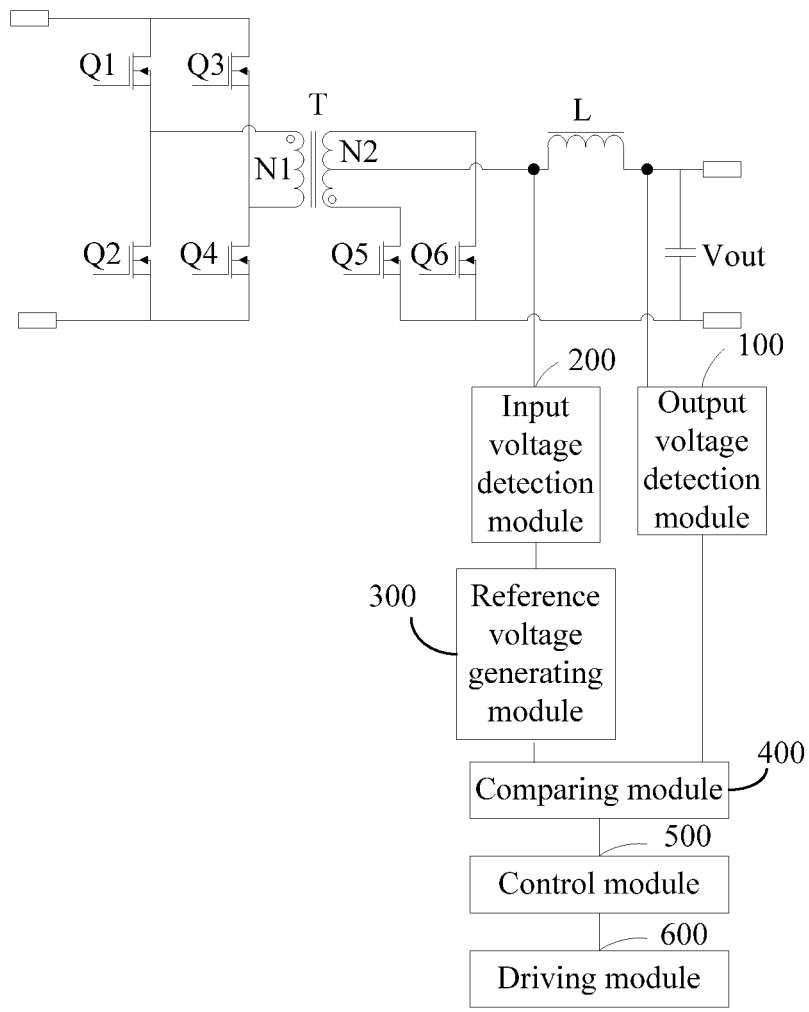
FIG. 2 is a schematic diagram of Circuit Embodiment 1 of a DC-DC conversion circuit according to the present invention.

Referring to FIG. 2, FIG. 2 is a schematic diagram of Circuit Embodiment 1 of a DC-DC conversion circuit according to the present invention.

To better understand and implement a technical solution of the present invention, the following first describes a topology of a primary DC-DC conversion circuit in an IBA.

As shown in FIG. 2, the primary circuit of the DC-DC conversion circuit is in a bridge topology.

The primary circuit includes: a first switching transistor Q1, a second switching transistor Q2, a third switching transistor Q3, a fourth switching transistor Q4, a fifth switching transistor Q5, a sixth switching transistor Q6, and a transformer (T); where a first end of the first switching transistor Q1 is connected to a positive end of an Vin, and a first end of the fourth switching transistor Q4 is connected to the positive end of the input voltage Vin; and a second end of the first switching transistor Q1 is connected to a homonymous end of a primary winding of the T, and a second end of the fourth switching transistor Q4 is connected to a non-homonymous end of the primary winding of the T; a first end of the second switching transistor Q2 is connected to the homonymous end of the primary winding of the T, and a first end of the third switching transistor Q3 is connected to the non-homonymous end of the primary winding of the T; and a second end of the second switching transistor Q2 is connected to a negative end of the Vin, and a second end of the third switching transistor Q3 is connected to the negative end of the Vin; a first end of the fifth switching transistor Q5 is connected to a homonymous end of the secondary winding of the T, and a first end of the sixth switching transistor Q6 is connected to a non-homonymous end of the secondary winding of the T; and a second end of the fifth switching transistor Q5 is connected to a negative end of an output voltage (Vout), and a second end of the sixth switching transistor Q6 is connected to the negative end of the Vout; and a tap of the secondary winding of the T is connected to a positive end of the output voltage Vout.

In a previous half period of the input voltage Vin, Q1 and Q3 are conducted with Q6 simultaneously at a same duty cycle.

In a later half period of the Vin, Q2 and Q4 are conducted with Q5 symmetrically at the same duty cycle.

In this working mode, all of the switching transistors (Q1-Q6) can achieve ZVS conduction, so as to reduce switch loss.

It should be noted that, in this conduction mode in the embodiment of the present invention, a working duty cycle of each switching transistor is not fixed or unchanged. In this case, the switching transistors include Q1 to Q4, and further include Q5 and Q6. Q5 and Q6 implement a function of a diode, and because conduction voltage drop exists in the diode, to reduce conduction loss of the diode, the switching transistors Q5 and Q6 are used for replacing the diode in this case.

The DC-DC conversion circuit provided in this embodiment includes: an output voltage detection module 100, an input voltage detection module 200, a reference voltage generating module 300, a comparing module 400, a control module 500, and a driving module 600.

The output voltage detection module 100 is configured to detect an output voltage of the DC-DC conversion circuit, and generate a feedback voltage signal Vout dec in a linear relationship with the output voltage.

It should be noted that, the output voltage detection module 100 may be implemented by using a bleeder circuit, for example, two resistors that are connected in series are connected in parallel with two ends of the output voltage of the DC-DC conversion circuit, where the two resistors implement dividing of the Vout, and a common end of the two resistors is used as an output end of the feedback voltage signal Vout dec. Because this technology belongs to a well-known technology of this field, examples are not further provided herein.

The input voltage detection module 200 is configured to detect a voltage at a secondary winding end of a transformer in the DC-DC conversion circuit, and generate an input voltage signal in a linear relationship with the voltage at the secondary winding end.

In this embodiment, a variation situation of the Vin is reflected by detecting the voltage at the secondary winding of the T. In this embodiment, the voltage is not directly detected at a primary side of the T to reflect the Vin.

In this embodiment, an advantage of detecting the voltage at a secondary winding side of the T is that: a trigger sampling manner may be used, that is, sampling is performed only when the tap of the secondary winding outputs a high level, and by sampling at the secondary winding, expensive components, such as a liner optical coupler, which need to be used in the sampling at the primary winding can be avoided.

It may be understood that, the tap of the secondary winding may be a central tap, or may not be a central tap.

The reference voltage generating module 300 is configured to generate a reference voltage according to the input voltage signal; where the reference voltage is in a linear relationship with the input voltage signal.

In this embodiment, the reference voltage is not fixed or unchanged, but is adjusted in real time by using the detected input voltage signal, and an objective of this operation is to vary the output voltage as the input voltage varies.

The comparing module 400 is configured to compare the feedback voltage signal and the reference voltage, and send a comparison result to the control module 500.

The control module 500 is configured to generate a duty cycle control signal according to the comparison result, and output the duty cycle control signal to the driving module 600.

The duty cycle control signal is adjusted according to the comparison result and is not a fixed or unchanged value.

The driving module 600 is configured to drive a switching transistor in the DC-DC conversion circuit according to the duty cycle control signal.

It should be noted that, a signal finally output by the driving module 600 to the switching transistor is a pulse width modulation (PWM) signal, where a duty cycle of the PWM signal is determined by the duty cycle control signal.

According to the DC-DC conversion circuit provided in this embodiment, variation of an input voltage is reflected by detecting an voltage at a secondary winding of a transformer, a reference voltage is adjusted by using the detected input voltage signal, a feedback voltage signal is compared with the reference voltage, a duty cycle control signal is adjusted according to a comparison result, and conduction and shutting-down of a switching transistor are controlled according to the duty cycle control signal to adjust an output voltage of the DC-DC conversion circuit, so as to enable the output voltage to vary with the input voltage. Therefore, the circuit provided in the present invention is a closed-loop control circuit and the output voltage is adjusted by detecting the output voltage, and in addition, the reference voltage is not fixed or unchanged but varies with the input voltage, so that a duty cycle does not vary in a wide range but is slightly adjusted in a small rage because an excessively wide range in which the duty cycle is adjusted may reduce conversion efficiency of the DC-DC conversion circuit. In conclusion, the circuit provided in this embodiment can not only adjust the output voltage according to the variation of the input voltage, but also achieve higher conversion efficiency.

It should be noted that, the reference voltage is in a linearly proportional relationship with the input voltage signal and the feedback voltage signal, which is specifically:

$$V_d = Vin\_dec * K * D/N \quad (1)$$

where $V_d$ is the reference voltage; Vin_dec is the input voltage signal; D is a working duty cycle of the switching transistor in the DC-DC conversion circuit; N is a turns ratio of a primary winding to a secondary winding of the transformer in the DC-DC conversion circuit; and K is a constant.

To make conversion efficiency of the circuit relatively high, the duty cycle control signal controls the working duty cycle of the switching transistor to be 40%-49%.

Figure 3:
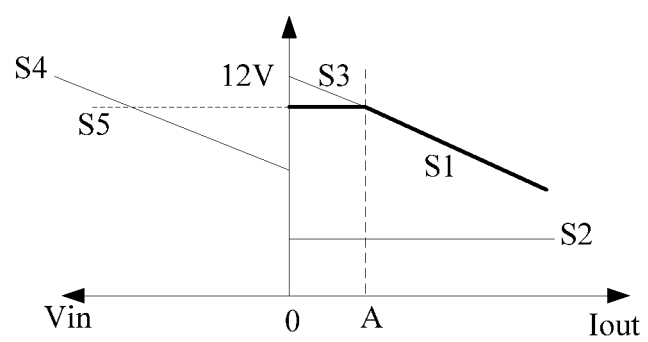
FIG. 3 is a wave-form diagram of major parameters corresponding to the embodiment according to FIG. 2.

To better express advantages of Circuit Embodiment 1 of the present invention, the following analyzes a wave-form diagram of major parameters of the circuit with reference to FIG. 3.

Essentially, FIG. 3 shows two coordinate systems which are pieced together, with the left being a relationship curve of the Vin and the Vout and the right being a relationship curve of the Vout and an output current (Iout).

In FIG. 3, the horizontal coordinate is the output current Iout, and the vertical coordinate is the Vout.

S2 is the Vout and is a fixed output, and in a regulated-voltage working mode, a relationship curve of an output voltage and an output current is exactly a straight line parallel to a current axis.

The straight line S3 refers to a relationship curve of an output voltage and an output current in the prior art when the Iout is between 0 and A. When the Iout is greater than A, S3 coincides with a part of S1.

S1 (a solid line thicker than S3) is a fold line, including a straight line, which is parallel to the current axis, of the Iout between 0 and A, and further including a straight line after the Iout is greater than A.

It may be seen from the figure that, when the Iout is within A, the circuit pertains to light-loaded, and when the Iout is greater than A, the circuit pertains to overloaded. When the circuit is light-loaded, the present invention pertains to closed-loop control, and when being overloaded, the circuit is saturate and turns to open-loop control. That is, when being light-loaded, the DC-DC conversion circuit works in a closed-loop regulated-voltage mode, and when the Iout varies, the Vout remains as a regulated voltage and is unchanged.

It can be seen from the relationship curve S4 of the Vin and the Vout on the left that, the Vout varies with the Vin.

S5 is a voltage of the primary winding detected at the secondary winding of the transformer.

Circuit Embodiment 2

Figure 4:
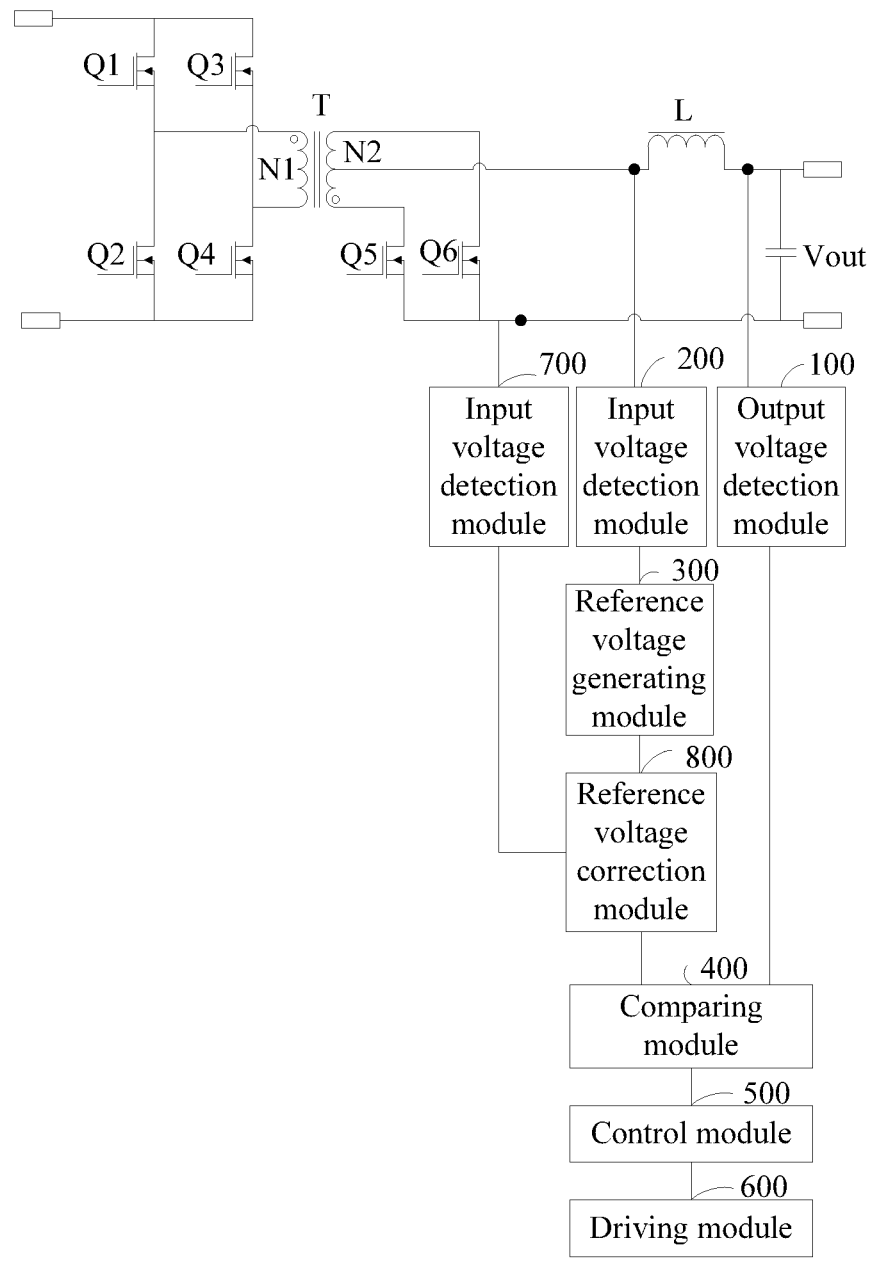
FIG. 4 is a schematic diagram of Circuit Embodiment 2 of a DC-DC conversion circuit according to the present invention.

Referring to FIG. 4, FIG. 4 is a schematic diagram of Circuit Embodiment 2 of a DC-DC conversion circuit according to the present invention.

In Circuit Embodiment 1, the reference voltage is adjusted only by using the input voltage signal, by which closed-loop control can be implemented when the circuit is light-loaded. However, when the circuit is overloaded, with increase of an output current, the circuit may work in an open-loop mode, so an adjusting range of a duty cycle is extremely limited in this case, that is, a variable range of the duty cycle is extremely narrow, and therefore, the circuit remains in a saturate state and the circuit enters into an uncontrollable open-loop mode. To enable the circuit continue to work in a closed-loop mode when the circuit is overloaded, Circuit Embodiment 2 is provided in the present invention, and the output current is introduced in Circuit Embodiment 2, so as to correct a reference voltage by using the output current, that is, the output voltage is purposefully lowered when the circuit is overloaded and in the open-loop mode.

The DC-DC conversion circuit provided in this embodiment further includes an output current detection module 700 and a reference voltage correction module 800; where the output current detection module 700 is configured to detect an output current of the DC-DC conversion circuit, generate a feedback current signal, and send the feedback current signal to the reference voltage correction module 800.

It should be noted that, the output current detection module 700 may specifically detect the output current between a second end of Q6 and a negative end of the output voltage.

In FIG. 4, a filter capacitor (C) may be further included, where the C is connected in parallel to two ends of the output voltage.

The reference voltage correction module 800 is configured to correct the reference voltage by using the feedback current signal. A comparing module 400 compares the feedback voltage signal and a reference voltage after the correction.

A correction relationship by means of which the reference voltage $V_d$ is corrected by using the feedback current signal Iout_dec is:

$$V_d' = K1 * V_d;$$

$$K1 = (1 - M * Iout\_dec);$$

where, K1 is a correction coefficient; $V_d'$ is the reference voltage after the correction; and M is a circuit voltage drop coefficient and is a constant.

After the reference voltage is made up for by using the output current, the DC-DC conversion circuit is enabled to implement the closed-loop control in all ranges of load, that is, the closed-loop control can be implemented both in light-load and overload, and the duty cycle can be adjusted within a very small range.

Figure 5:
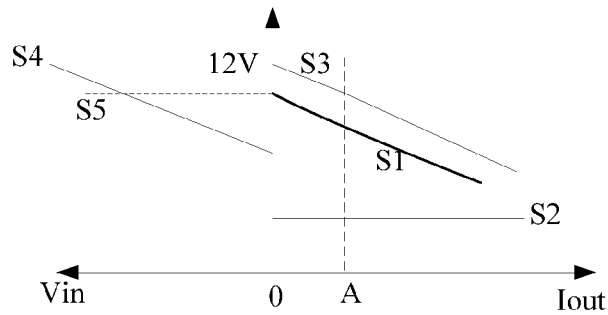
FIG. 5 is a wave-form diagram of major parameters corresponding to the embodiment according to FIG. 4.

The following analyzes, with reference to FIG. 5, a wave form after adding current correction.

Referring to FIG. 5, FIG. 5 is a wave-form diagram of major parameters of the embodiment corresponding to FIG. 4.

A difference between FIG. 5 and FIG. 3 is that, it may be seen from the relationship curve of the Vout and the Iout on the right that, in closed-loop control, the curve is lowered and moved downward parallelly, and therefore, the Vout in the closed-loop control is less than the Vout in the open-loop control.

It may be understood that, the DC-DC conversion circuit provided in the foregoing embodiment is described by using an application in an IBA as an example, and the circuit supplies power to a point-of-load in the IBA, so as to improve working efficiency of the IBA. That is, a primary circuit topology of the DC-DC conversion circuit may further be another form, and because a primary circuit topology technology is mature in this field, examples are not further provided for description herein.

Based on the DC-DC conversion circuit provided in the foregoing embodiment, the present invention further provides a DC-DC conversion method, where the method is applied in the DC-DC conversion circuit, and the following describes specific implementation steps of the method with reference to the accompanying drawings.

Method Embodiment 1

Figure 6:
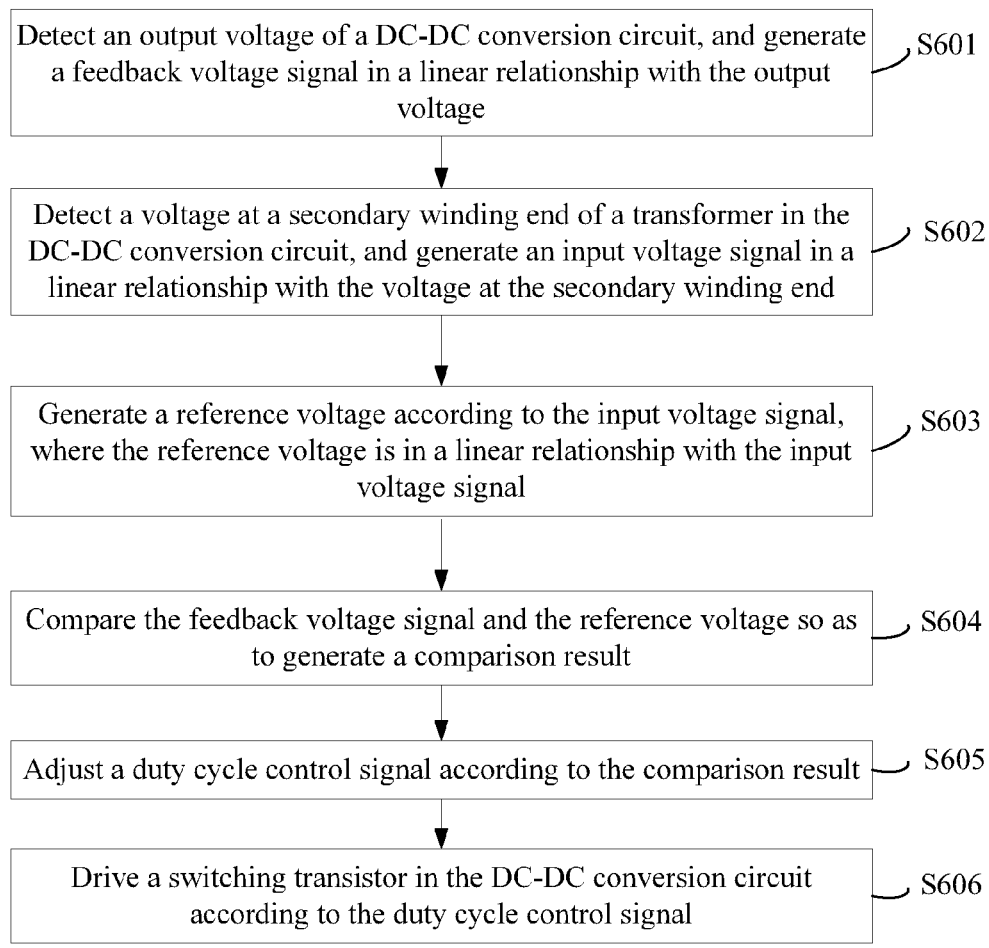
FIG. 6 is a flowchart of Method Embodiment 1 of a DC-DC conversion method according to the present invention.
Figure 7:
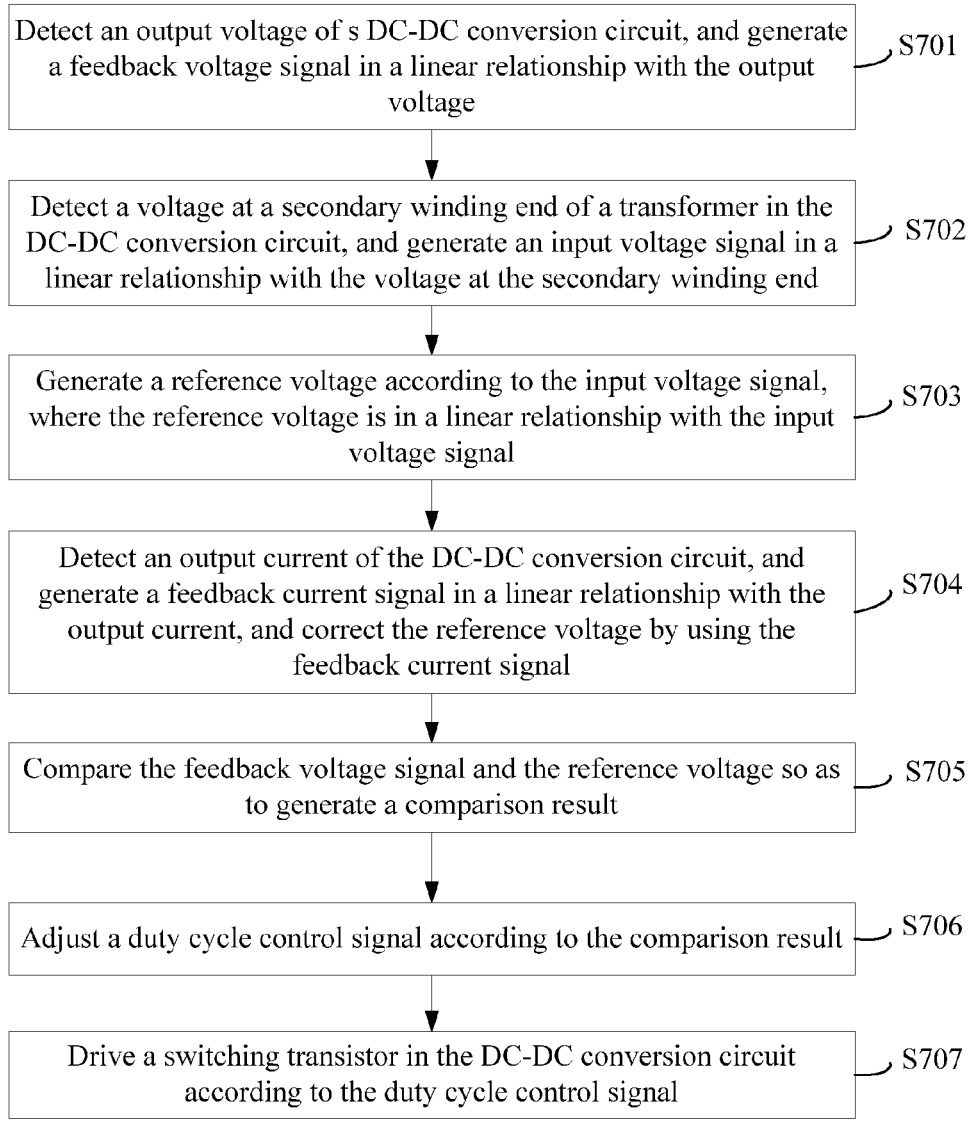
FIG. 7 is a flowchart of Method Embodiment 2 of a DC-DC conversion method according to the present invention.

Referring to FIG. 6, FIG. 6 is a flowchart of Method Embodiment 1 of a DC-DC conversion method according to the present invention.

The DC-DC conversion method provided in this embodiment is applied in a DC-DC conversion circuit and includes the following steps:

It should be noted that, for a topology of the DC-DC conversion circuit, reference may be specifically made to FIG. 2.

A key of the DC-DC conversion method provided in the embodiment of the present invention is: reflecting an input voltage Vin by detecting a voltage at a secondary winding end of a transformer, adjusting a reference voltage by using the voltage detected at the second winding end, and comparing the reference voltage and a detected output voltage, so as to adjust a duty cycle control signal. That is, the embodiment of the present invention implements adjustment of a duty cycle through closed-loop control, and the duty cycle is not fixed or unchanged. The reference voltage increases with an increase of the Vin, so that the output voltage also increases with the Vin.

S601: Detect an output voltage of a DC-DC conversion circuit, and generate a feedback voltage signal in a linear relationship with the output voltage.

S602: Detect a voltage at a secondary winding end of a transformer in the DC-DC conversion circuit, and generate an input voltage signal in a linear relationship with the voltage at the secondary winding end.

S603: Generate a reference voltage according to the input voltage signal, where the reference voltage is in a linear relationship with the input voltage signal.

In this embodiment, the reference voltage is not fixed or unchanged, but is adjusted in real time by using the detected input voltage signal, and an objective of this operation is to vary the output voltage as the input voltage varies.

S604: Compare the feedback voltage signal and the reference voltage so as to generate a comparison result.

S605: Adjust a duty cycle control signal according to the comparison result.

The duty cycle control signal is adjusted according to the comparison result but is not a fixed or unchanged value.

S606: Drive a switching transistor in the DC-DC conversion circuit according to the duty cycle control signal.

It should be noted that, a signal finally output to the switching transistor is a PWM signal, where a duty cycle of the PWM signal is determined by the duty cycle control signal.

According to the DC-DC conversion circuit provided in this embodiment, variation of an input voltage is reflected by detecting an voltage at a secondary winding of a transformer, a reference voltage is adjusted by using the detected input voltage signal, a feedback voltage signal is compared with the reference voltage, a duty cycle control signal is adjusted according to a comparison result, and conduction and shutting-down of switching transistor are controlled according to the duty cycle control signal to adjust an output voltage of the DC-DC conversion circuit, so as to enable the output voltage to vary with the input voltage. Therefore, the circuit provided in the present invention is a closed-loop control circuit and the output voltage is adjusted by detecting the output voltage, and in addition, the reference voltage is not fixed or unchanged but varies with the input voltage, so that a duty cycle does not vary in a wide range but is slightly adjusted in a small rage, because an excessively wide range in which the duty cycle is adjusted may reduce conversion efficiency of the DC-DC conversion circuit. In conclusion, the circuit provided in this embodiment can not only adjust the output voltage according to the variation of the input voltage, but also achieve higher conversion efficiency.

To make the conversion efficiency of the circuit be relatively high, the duty cycle control signal controls the working duty cycle of the switching transistor to be 40%-49%.

Method Embodiment 2

In Method Embodiment 1, the reference voltage is adjusted only by using the input voltage signal, by which closed-loop control can be implemented when a circuit is light-loaded. However, when the circuit is overloaded, with an increase of an output current, the circuit may work in an open-loop mode, so an adjusting range of a duty cycle is extremely limited in this case, that is, a variable range of the duty cycle is extremely narrow, and therefore, the circuit remains in a saturate state and the circuit enters into an uncontrollable open-loop mode. To enable the circuit continue to work in a closed-loop mode when the circuit is overloaded, Method Embodiment 2 is provided in the present invention, and the output current is introduced into Method Embodiment 2, so as to correct a reference voltage by using the output current, that is, the output voltage is purposefully lowered when the circuit is overloaded and in the open-loop mode.

In this embodiment, S701 to S703 are respectively the same as S601 to S603 in Method Embodiment 1.

In the present invention, a step S704 is added before S604 in Method Embodiment 1.

S704: Detect an output current of the DC-DC conversion circuit, and generate a feedback current signal in a linear relationship with the output current, and correct the reference voltage by using the feedback current signal.

S705 to S707 are respectively the same as S604 to S606 in Method Embodiment 1, which is not further described herein.

After the reference voltage is made up for by using the output current, the DC-DC conversion circuit is enabled to implement closed-loop control in all ranges of load, that is, the closed-loop control can be implemented both in light-load and overload, and the duty cycle can be adjusted within a very small range.

It may be understood that, the DC-DC conversion method provided in the foregoing embodiment is described by using an application in an IBA as an example, and the circuit supplies power to a point-of-load in the IBA, so as to improve working efficiency of the IBA. That is, a primary circuit topology of the DC-DC conversion circuit may further be another form, and because a primary circuit topology technology is mature in this field, examples are not further provided for description herein.

The foregoing descriptions are merely preferable embodiments of the present application, but are not intended to limit the present application in any form. Although the exemplary embodiments of the present application are disclosed above, the embodiments are not intended to limit the present application. By using the method and the technical content disclosed above, any person of ordinary skill in the art can make a plurality of possible variations and modifications on the technical solutions of the present application, or amend the technical solutions thereof to be equivalent embodiments through equivalent variations without departing from the protection scope of the technical solutions of the present application. Therefore, any simple amendments, equivalent variations, and modifications made on the above embodiments according to the technical essence of the present application without departing from the content of the technical solutions of the present application shall fall within the protection scope of the technical solutions of the present application.

What is claimed is:

1. A direct current (DC)-DC conversion circuit, comprising a processor configured to:
    detect an output voltage of the DC-DC conversion circuit;
    generate a feedback voltage signal in a linear relationship with the output voltage;
    detect a voltage at a secondary winding end of a transformer in the DC-DC conversion circuit;
    generate an input voltage signal in a linear relationship with the voltage at the secondary winding end;
    generate the reference voltage according to the input voltage signal;
    compare the feedback voltage signal and the reference voltage;
    generate a duty cycle control signal according to the comparison result; and
    drive a switching transistor in the DC-DC conversion circuit according to the duty cycle control signal,
    wherein the reference voltage is in a linearly proportional relationship with the input voltage signal and the feedback voltage signal,
    wherein the linearly proportional relationship is $V_d=Vin\_dec*K*D/N$,
    wherein $V_d$ is the reference voltage,
    wherein Vin_dec is the input voltage signal,
    wherein D is a working duty cycle of the switching transistor in the DC-DC conversion circuit,
    wherein N is a turns ratio of a primary winding to a secondary winding of the transformer in the DC-DC conversion circuit, and
    wherein K is a constant.

2. The DC-DC conversion circuit according to claim 1, wherein the processor is further configured to:
    detect an output current of the DC-DC conversion circuit;
    generate a feedback current signal; and
    correct the reference voltage using the feedback current signal.

3. The DC-DC conversion circuit according to claim 2, wherein a correction relationship by means of which the reference voltage correction module is configured to correct the reference voltage ($V_d$) by using the feedback current signal (Iout_dec) is $V_d'=K1*V_d$ and $K1=(1-M*Iout\_dec)$, wherein K1 is a correction coefficient, wherein $V_d'$ is the reference voltage after the correction, and wherein M is a circuit voltage drop coefficient and is a constant.

4. The DC-DC conversion circuit according to claim 1, wherein the duty cycle control signal controls the working duty cycle of the switching transistor to be 40%-49%.

5. The DC-DC conversion circuit according to claim 1, wherein a primary circuit of the DC-DC conversion circuit comprises a first switching transistor; a second switching transistor; a third switching transistor a fourth switching transistor; a fifth switching transistor; a sixth switching transistor; and the transformer, wherein a first end of the first switching transistor is connected to a positive end of the input voltage, wherein a first end of the fourth switching transistor is connected to the positive end of the input voltage, wherein a second end of the first switching transistor is connected to a homonymous end of a primary winding of the transformer, wherein a second end of the fourth switching transistor is connected to a non-homonymous end of the primary winding of the transformer, wherein a first end of the second switching transistor is connected to the homonymous end of the primary winding of the transformer, wherein a first end of the third switching transistor is connected to the non-homonymous end of the primary winding of the transformer, wherein a second end of the second switching transistor is connected to a negative end of the input voltage, wherein a second end of the third switching transistor is connected to the negative end of the input voltage, wherein a first end of the fifth switching transistor connected to a homonymous end of the secondary winding of the transformer, wherein a first end of the sixth switching transistor is connected to a non-homonymous end of the secondary winding of the transformer, wherein a second end of the fifth switching transistor is connected to a negative end of the output voltage, wherein a second end of the sixth switching transistor is connected to the negative end of the output voltage, and wherein a tap of the secondary winding of the transformer is connected to a positive end of the output voltage.

6. The DC-DC conversion circuit according to claim 5, further comprising a filter inductor, wherein the tap of the secondary winding of the transformer is connected to the positive end of the output voltage through the filter inductor, and wherein the processor is configured to detect the voltage at the secondary winding end of the transformer at a common end of the filter inductor and the tap of the secondary winding.

7. The DC-DC conversion circuit according to claim 1, wherein the DC-DC conversion circuit is applied in an intermediate bus power supply architecture, and wherein the output voltage of the DC-DC conversion circuit supplies power to a point-of-load of the intermediate bus power supply architecture.

8. A DC-DC conversion method, wherein the method is applied in a direct current (DC)-DC conversion circuit and comprises the following steps:
    detecting an output voltage of the DC-DC conversion circuit;
    generating a feedback voltage signal in a linear relationship with the output voltage;

detecting a voltage at a secondary winding end of a transformer in the DC-DC conversion circuit;

generating an input voltage signal in the linear relationship with the voltage at the secondary winding end;

generating a reference voltage according to the input voltage signal, wherein the reference voltage is in the linear relationship with and the input voltage signal;

comparing the feedback voltage signal and the reference voltage so as to generate a comparison result;

adjusting a duty cycle control signal according to the comparison result; and driving a switching transistor in the DC-DC conversion circuit according to the duty cycle control signal, wherein the linear relationship is $V_d = Vin\_dec * K * D/N$, wherein $V_d$ is the reference voltage, wherein $Vin\_dec$ is the input voltage signal, wherein D is a working duty cycle of the switching transistor in the DC-DC conversion circuit, wherein N is a turns ratio of a primary winding to a secondary winding of the transformer in the DC-DC conversion circuit, and wherein K is a constant.

9. The DC-DC conversion method according to claim 8, wherein before comparing the feedback voltage signal and the reference voltage, the method further comprises:

detecting an output current of the DC-DC conversion circuit, and generating a feedback current signal in the linear relationship with the output current; and correcting the reference voltage by using the feedback current signal.

\* \* \* \* \*